United States Patent [19]
Laiho

[11] Patent Number: 5,978,685
[45] Date of Patent: Nov. 2, 1999

[54] DIGITAL CELLULAR TELECOMMUNICATIONS WITH SHORT MESSAGE SERVICE OVER THE PACKET CHANNEL

[75] Inventor: Keijo Laiho, Espoo, Finland

[73] Assignee: Telefonaktiebolaget L/M Ericsson, Stockholm, Sweden

[21] Appl. No.: 08/990,499

[22] Filed: Dec. 15, 1997

[51] Int. Cl.[6] .................................................. H04Q 7/18
[52] U.S. Cl. ...................... 455/466; 455/556; 455/557; 455/553; 455/575
[58] Field of Search .................... 455/466, 556, 455/557, 558, 559, 560, 445, 567, 575, 553, 403; 370/349, 522, 524, 352, 353, 354; 340/825.04, 825.44, 825.79

[56] References Cited

U.S. PATENT DOCUMENTS

| | | |
|---|---|---|
| 5,528,664 | 6/1996 | Slekys et al. ....................... 455/466 X |
| 5,533,019 | 7/1996 | Jayapalan ............................. 455/466 X |
| 5,548,586 | 8/1996 | Kito et al. ............................. 455/466 X |
| 5,577,102 | 11/1996 | Koivunen ............................. 455/466 X |
| 5,706,211 | 1/1998 | Beletic et al. ....................... 455/466 X |
| 5,802,465 | 9/1998 | Hamalainen et al. ................. 455/403 |

FOREIGN PATENT DOCUMENTS

| | | | |
|---|---|---|---|
| 0642283 | 3/1995 | European Pat. Off. ......... H04Q 7/22 |
| 9516330 | 6/1995 | WIPO ............................... H04Q 7/22 |
| WO 97/26765 | 1/1997 | WIPO . |
| 9708906 | 3/1997 | WIPO ............................... H04Q 7/22 |

Primary Examiner—Wellington Chin
Assistant Examiner—Yemane Woldetatios
Attorney, Agent, or Firm—Jenkens & Gilchrist, P.C.

[57] ABSTRACT

An apparatus in a wireless telecommunications network is provided with Short Message Service via a circuit switched channel unless the apparatus is operating in a packet mode. If the apparatus is operating in the packet mode, the apparatus is provided with Short Message Service via a packet channel.

33 Claims, 6 Drawing Sheets

DIGITAL CELLULAR TELECOMMUNICATIONS WITH SHORT MESSAGE SERVICE OVER THE PACKET CHANNEL

FIELD OF THE INVENTION

The invention relates to digital cellular telecommunications systems and, more particularly, to an improvement in Short Message Service in such systems.

BACKGROUND OF THE INVENTION

FIG. 1 illustrates a conventional digital cellular telecommunications systems, namely, the system conventionally known as the Personal Digital Cellular (PDC) system. One feature of this system is to provide Internet connectivity to mobile stations using the conventional RCR 27 Standard, which is incorporated herein by reference. Data transfer for Internet connectivity in the system of FIG. 1 is based on the Internet Protocol (IP), that is, the packet data transmission model is implemented end-to-end, including the air interface. The example of FIG. 1 represents one way to implement the network structure for PDC packet and circuit services.

In FIG. 1, the Visited Mobile Services Switching Center (VMSC) and the Gateway Mobile Services Switching Center (GMSC) implement the circuit based services to the Public Switched Telephony Network (PSTN) or to the Integrated Services Digital Network (ISDN). VMSC also implements the circuit based functions related to the Control Channel (CCH) towards the mobile station (MS). One example of such functions, location registration, is used to update the location of the mobile station MS to the Home Location Register (HLR).

The Visited Packet Mobile Services Switching Center (VPMSC) and the Gateway Packet Mobile Services Switching Center (GPMSC) implement the packet data services. VPMSC controls the User Packet Channel (UPCH) towards the mobile station MS and it also implements the mobility functions for the mobile station while the mobile station is in packet mode. GPMSC controls connections toward the Internet.

The network also contains nodes for specific functions. For example, the Short Message Services Center (SMSC) implements short message storage and delivery functions for the Short Message Service (SMS). SMS uses the ISDN User Part (ISUP) for signaling within the mobile network in generally the same way that it is used for establishing normal speech calls. The SMSC can also be connected to the Internet, which makes it possible to use E-mail for providing Short Message Service to the mobile station.

In FIG. 1, when the mobile station is using Internet services, the mobile station MS communicates with the base station BS and VPMSC through the UPCH. This means that the mobile station is essentially locked to UPCH, and therefore cannot monitor other channels such as the paging channel on CCH. The packet session is further connected via the internal backbone and GPMSC to the Internet.

If the mobile station receives a speech call from PSTN while the mobile station is using Internet services (i.e., during a packet session), then GMSC receives the speech call from PSTN and interrogates HLR for the location of the mobile station. HLR has information about the mobile station location and also has information indicating that the mobile station is in packet mode. That information is returned to GMSC, so that GMSC can reroute the call to VMSC, in whose service area the mobile station is currently located.

Because the mobile station is in packet mode, there is no need for VMSC to page the mobile station on CCH. Therefore, VMSC orders VPMSC to send the paging order on UPCH. If the subscriber using the mobile station accepts the incoming speech call, then the mobile station sends this acceptance on UPCH. The mobile station then closes the current packet session, and establishes a connection on traffic channel TCH to receive the incoming speech call.

Conventionally, when the mobile station is in the packet mode, the mobile network handles an incoming short message similarly to an incoming speech call. In this case, and referencing also FIG. 2, the short message is received in SMSC, which then calls GMSC (20). GMSC then interrogates HLR (21) to obtain the latest information about the mobile station. GMSC then calls VMSC (22). If (23) the mobile station is not in packet mode, then CCH is used to provide the Short Message Services. If (23) the mobile station is in packet mode, VMSC calls VPMSC (25), and VPMSC pages the mobile station on UPCH (26).

Because the mobile station is in the packet mode and therefore monitoring UPCH, the user of the mobile station can accept the incoming call and agree to receive the incoming short message. Similarly to the situation described above with respect to the speech call, the mobile station closes the packet session and establishes a connection on CCH in order to receive the short message (27). VMSC then sends the short message on CCH using the layer 3 protocol of the conventional OSI protocol stack (28).

The above-described conventional techniques have the following disadvantages. Because the short message includes only textual information, it is quite inefficient to force the mobile station to move from UPCH to CCH to receive the short message. To close the packet session, the user will generally have to terminate the session to Internet before accepting the incoming call. Moreover, at the time that the incoming call is accepted, the user does not even know that the incoming communication is a short message, which can, of course, be stored and read later without requiring the user to close the current packet session. For example, because the user might not want to take the risk of missing a speech call, the user may interrupt and close the packet session to accept a call (textual message) that could have waited until the user had finished the packet session. Also, the process of closing the packet session and establishing the connection to CCH to receive the short message (and the subsequent reopening of the packet session) disadvantageously requires a significant amount of signaling between the mobile station and the network.

Other conventional systems use an Internet service, such as E-mail, for sending all short messages to the mobile subscriber. The SMSC transfers all SMS messages to the E-mail application. Although such systems do not give rise to the aforementioned disadvantages, nevertheless, circuit switched Short Message Service is typically more appropriate for sending short messages because it usually will provide the message to the intended party in a more timely fashion than will E-mail.

It is therefore desirable to provide Short Message Service that avoids the aforementioned disadvantages.

The present invention avoids the aforementioned disadvantages by using the packet channel to deliver SMS messages, but only if the mobile station is already in the packet mode.

The present invention also avoids the aforementioned disadvantages by using the layer 3 protocol of the OSI protocol stack to transmit SMS messages over the packet channel.

DETAILED DESCRIPTION

Figure 1:
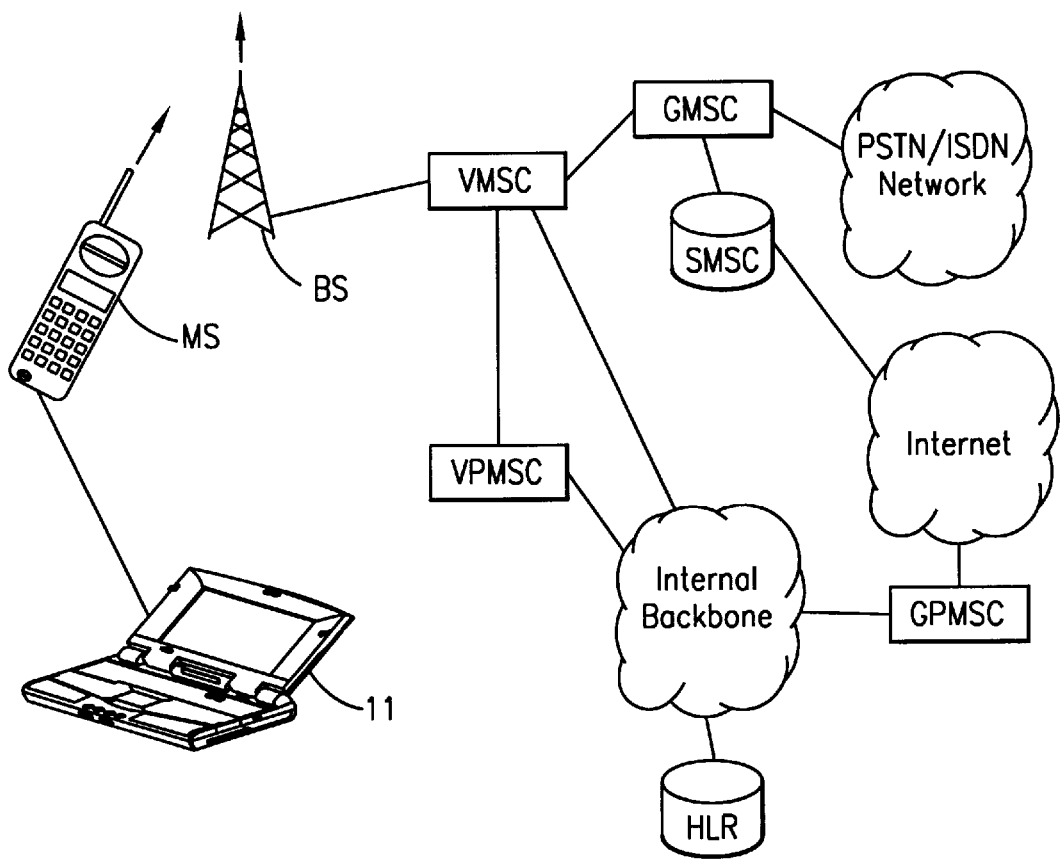
FIG. 1 illustrates a conventional digital cellular telecommunications system.
Figure 3:
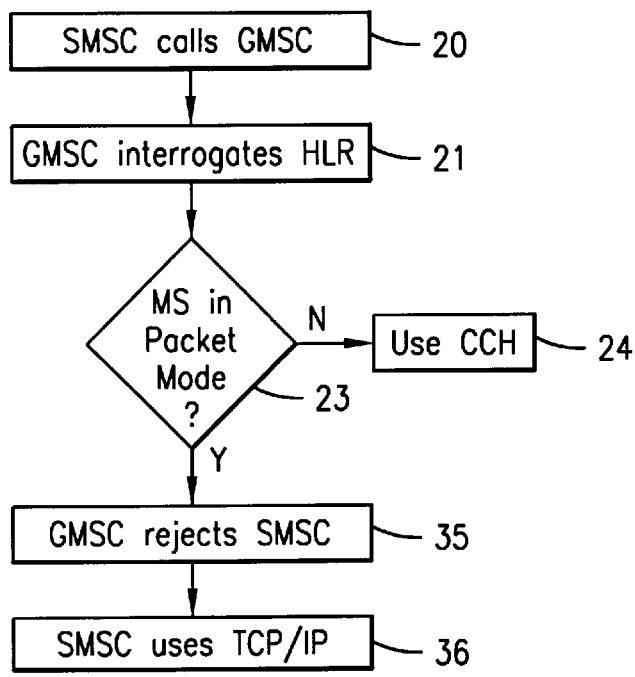
FIG. 3 illustrates a technique according to the present invention for handling Short Message Service when the mobile station is in the packet mode.

Example FIG. 3 illustrates an implementation of Short Message Service according to the present invention. Referring also to FIG. 1, when SMSC receives the message to be sent by Short Message Service, SMSC calls GMSC (20). GMSC then interrogates HLR (21) to obtain information about the mobile station. If (23) the mobile station is not in the packet mode, then CCH is used to provide the short message (24) service, as is conventional. However, if (23) the mobile station is in the packet mode, then GMSC rejects the call from SMSC (35). This rejection message can be accomplished by using a special predefined Cause Code, or a diagnostic field in the Cause parameter can be used in the ISUP signaling.

Figure 4:
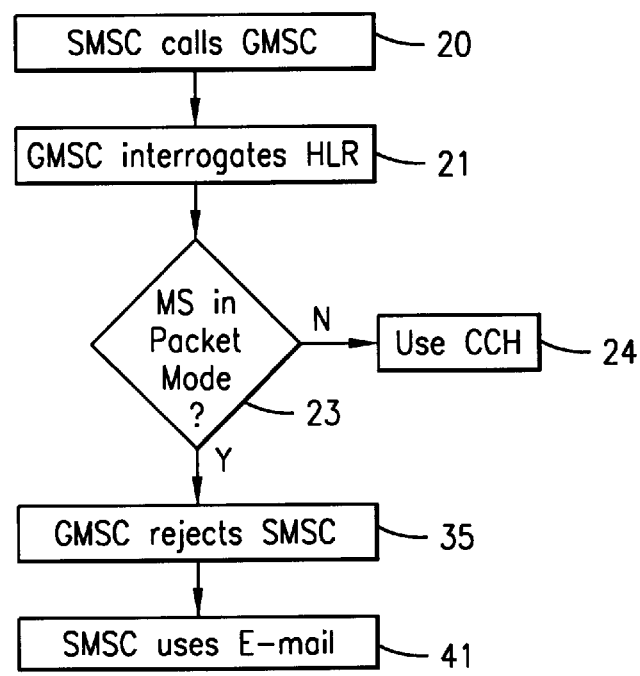
FIG. 4 illustrates another technique according to the present invention for handling Short Message Service when the mobile station is in the packet mode.

Upon receiving the rejection from GMSC, SMSC sends the short message over UPCH using a TCP/IP connection through VPMSC to the mobile station (36). This can be accomplished using an existing conventional TCP/IP application such as an E-mail browser, in which case the short message is sent via E-mail. Example FIG. 4 is similar to FIG. 3, but illustrates SMSC specifically using E-mail (41) to send the short message.

An alternate way to use TCP/IP for short messages is to provide both SMSC and a computer connected to the mobile station with a dedicated application and a dedicated port for sending the short message over the TCP/IP connection. The dedicated application in the SMSC would receive the message from the conventional SMSC application. This interface would be the same as exists in conventional SMSC applications that support sending short messages to E-mail. At reception of the short message, the dedicated application in SMSC sends the message to the mobile station by using the TCP/IP connection over UPCH. The message to the mobile station would include the calling address, called address, subject and the body text. The called address of the mobile subscriber is an IP address. This address is the same as used by the Internet when communicating with the mobile station. This address can be predefined in the SMSC.

The new application would have a new application port number for use in TCP. The port number is used to invoke the appropriate application in the remote host. Such port handling is well-known in the art.

The dedicated TCP/IP application on the mobile station side would receive the message and, for example, open the pop-up menu for the user. The user would then be able to read the message, and store it to hard disk in the portable computer (see FIG. 1), or to memory in the mobile station.

The above-described implementation of dedicated applications and ports for TCP/IP is well-known in the art.

Figure 2:
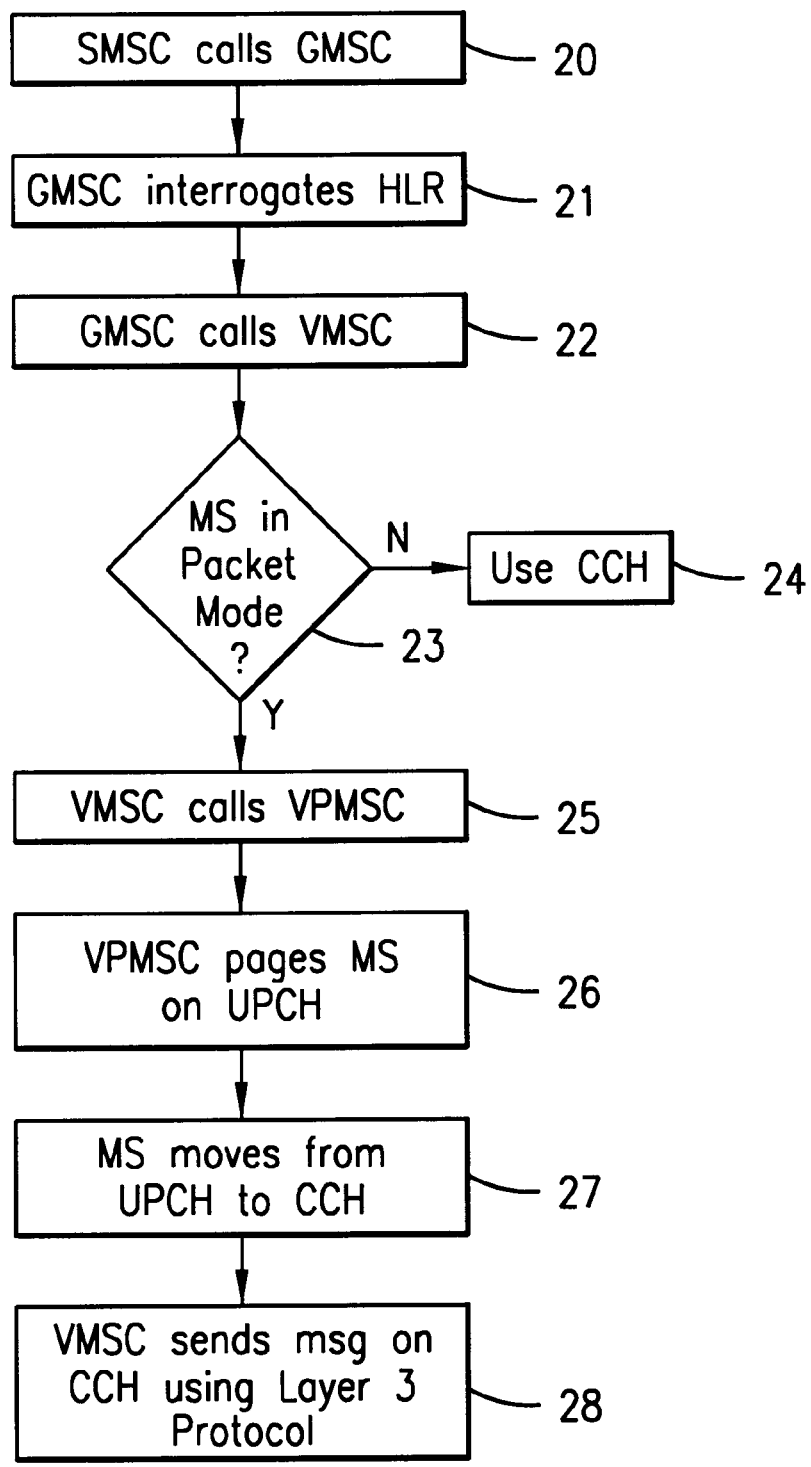
FIG. 2 illustrates a conventional approach to providing Short Message Service when the mobile station is in the packet mode.
Figure 5:
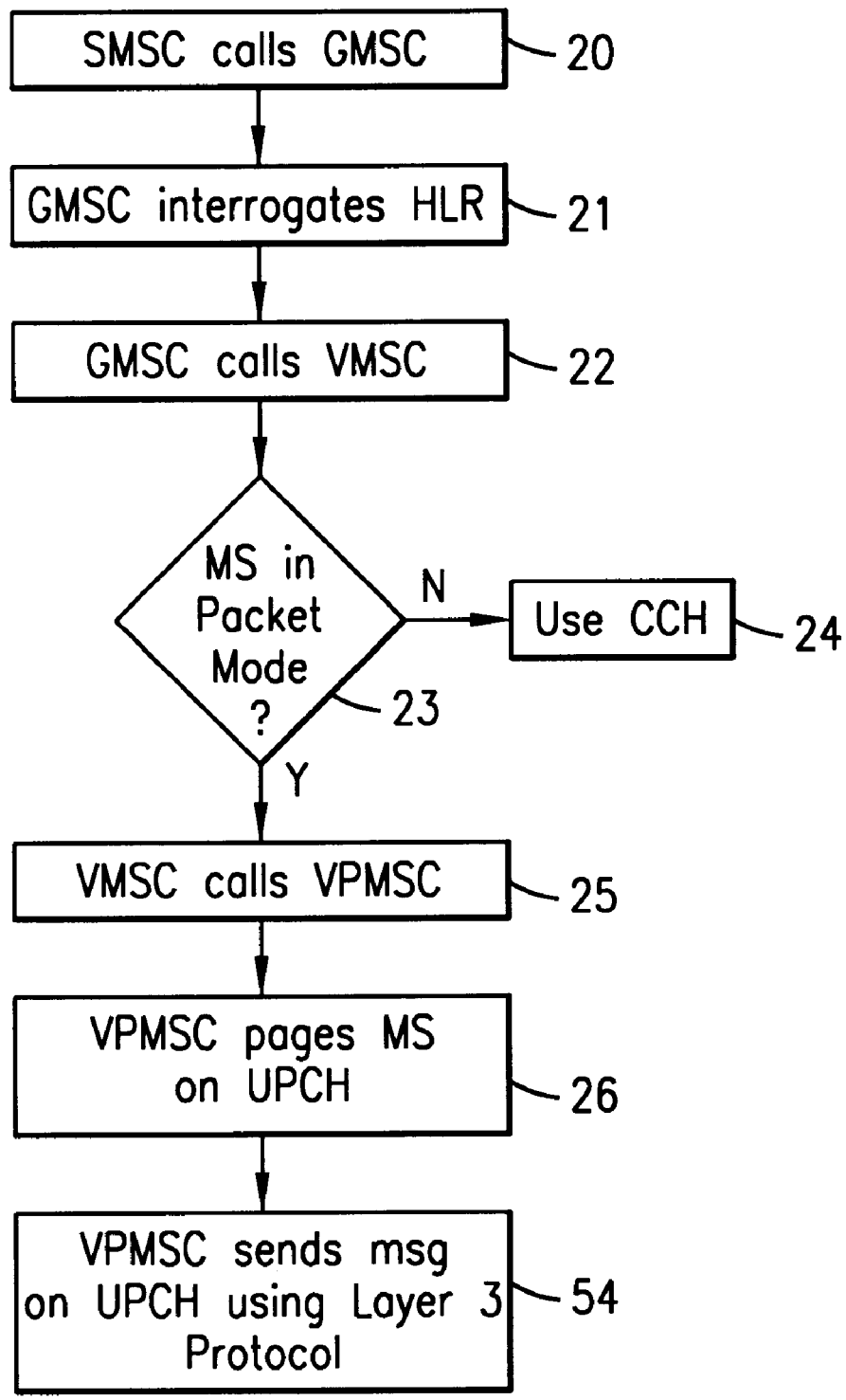
FIG. 5 illustrates another technique according to the present invention for handling Short Message Service when the mobile station is in the packet mode.

FIG. 5 illustrates another technique according to the present invention for handling Short Message Service when the mobile station is in the packet mode. The technique of FIG. 5 is similar to the conventional technique of FIG. 2, except in FIG. 5 the mobile station does not move from UPCH to CCH after receiving at 26 the page from VPMSC on UPCH. Instead, in FIG. 5, VPMSC is used to send the short message on UPCH using the layer 3 protocol of the conventional OSI protocol stack (54). In particular, the SETUP message of the layer 3 protocol is used to communicate the message to the mobile station. Because layer 3 of the OSI stack is conventionally terminated in the mobile station, the mobile station can receive and handle the short message in the same way as if it was received on CCH.

The above-described use of the layer 3 protocol on UPCH is readily implemented in software in VPMSC.

Techniques analogous to those shown in FIGS. 3–5 can also be used for mobile-originated short messages. The short message can be sent from either the mobile station or from the computer 11 (see FIG. 1) over UPCH to VPMSC. VPMSC then sends the message directly to SMSC if the TCP/IP method is used. If the layer 3 method is used, then the short message is sent from VPMSC to SMSC via network components implementing the circuit switch services, namely VMSC and GMSC. Thus, CCH does not need to be used for sending short messages while the mobile station is involved in a packet session. Rather, the existing connection on UPCH is used to handle the short messages.

Figure 6:
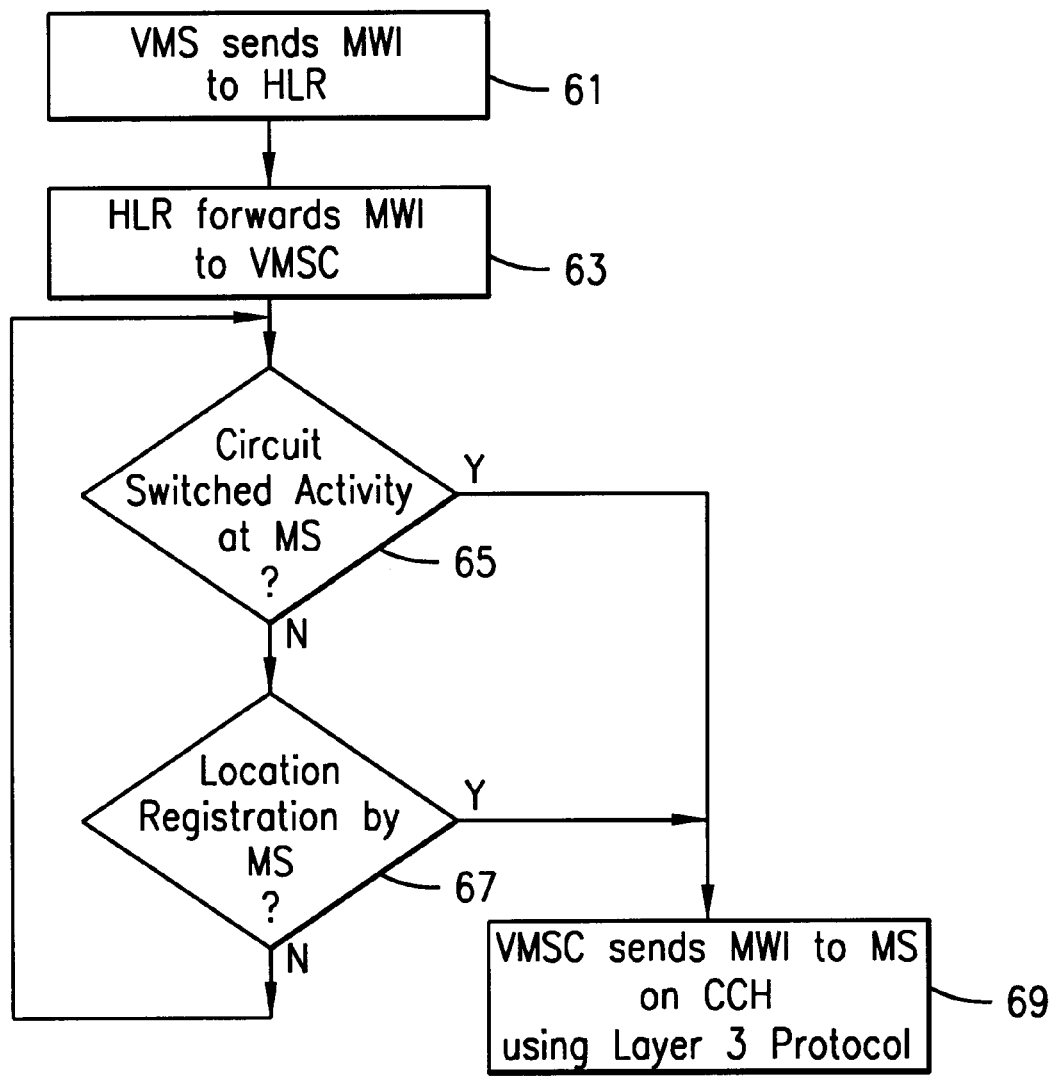
FIG. 6 illustrates a conventional approach to providing Message Waiting Indication Service to a mobile station.

The technique described above with respect to FIG. 5 can, in general, be used for any service which does not require speech channel TCH, but which needs only a signaling path to the mobile station MS. One example of such a service is conventional Message Waiting Indication (MWI). MWI is sent to MS when there is new voice message in a voice mail system (VMS). In the conventional operation illustrated in FIG. 6, VMS sends an MWI to HLR about the new message or messages (61). The HLR forwards the NWI to the VMSC (63) in whose area the MS is located. If the MS shows any circuit-switched activity (65), for example, establishes a circuit-switched call, or if the MS makes a location registration (67), the MWI is sent from VMSC to the MS on CCH using the Layer 3 protocol (69). This can be done by sending to MS a display information element in a SETUP message using the Layer 3 protocol. The display information element can be, for example, a text message to be shown in the display of the mobile station. It can also be a specific figure or icon to be shown in the display of the mobile station.

After the subscriber has made a call from MS to VMS, VMS sends a cancel order via HLR to VMSC, which then knows that the MWI does not need to be sent to MS anymore.

Figure 7:
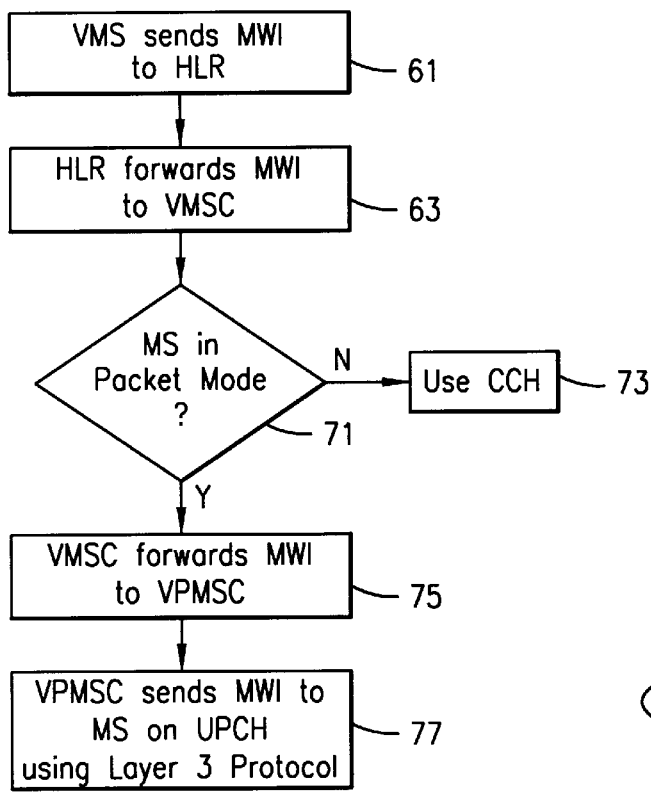
FIG. 7 illustrates a technique according to the present invention for providing Message Waiting Indication Service to a mobile station that is in the packet mode.

In similar fashion to the technique described above with respect to FIG. 5, the MWI can, according to the invention, be sent over UPCH to MS. This will be described with reference to example FIG. 7. When MWI is received by VMSC in the conventional manner (see 61 and 63 in FIGS. 6 and 7), it is determined at 71 whether MS is in the packet mode. If not, then VMSC uses CCH (73) to deliver the MWI in conventional fashion (see 65, 67 and 69 of FIG. 6). If MS is in the packet mode at 71, then VMSC forwards MWI to VPMSC at 75. Then, at 77, VPMSC sends MWI to MS on UPCH using the SETUP message of the Layer 3 protocol. The MWI can also be sent on UPCH to MS at the start of a packet session and at the end of a packet session.

Figure 8:
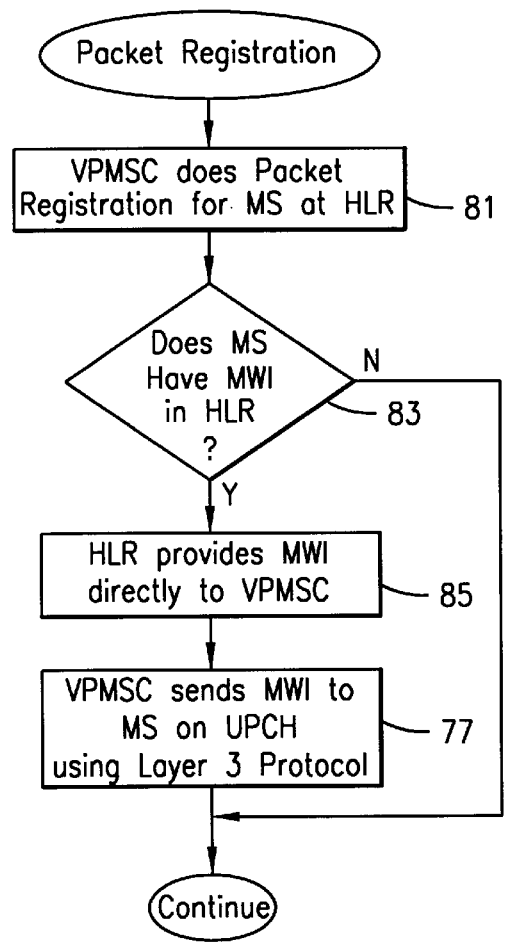
FIG. 8 illustrates another technique according to the present invention for providing Message Waiting Indication Service to a mobile station that is in the packet mode.

VPMSC can receive MWI directly from HLR if VPMSC is performing packet communication registration to HLR, that is, informing HLR that MS is entering the packet mode. This is illustrated in example FIG. 8. At 81, VPMSC performs packet registration for MS at HLR. During packet registration, it is determined at 83 whether MS has an MWI in HLR. If not, packet registration continues as needed. If MS has an MWI in HLR, then HLR provides MWI directly to VPMSC at 85. At 77, VPMSC sends MWI to MS in the same manner as at 77 in FIG. 7.

Although exemplary embodiments of the present invention have been described above in detail, this does not limit the scope of the invention, which can be practiced in a variety of embodiments.

What is claimed is:

1. A method of providing Short Message Service in a wireless telecommunications network, comprising:
    determining whether a receiving apparatus to which a Short Message Service message is to be delivered is operating in a packet mode;
    delivering the message to the receiving apparatus via a circuit switched channel unless the receiving apparatus is operating in the packet mode; and
    delivering the message to the receiving apparatus via a packet channel if the receiving apparatus is operating in the packet mode.

2. The method of claim 1, wherein the receiving apparatus is a mobile communication device.

3. The method of claim 2, wherein said last-mentioned delivering step includes using a TCP/IP application to deliver the message.

4. The method of claim 3, wherein the TCP/IP application is an E-mail browser.

5. The method of claim 3, wherein said last-mentioned delivering step includes sending the message from a Short Message Services Center to the mobile communication device via the packet channel.

6. The method of claim 3, wherein the TCP/IP application is dedicated to sending Short Message Service messages over the packet channel.

7. The method of claim 2, wherein said last-mentioned delivering step includes using the layer 3 protocol of the OSI protocol stack to deliver the message.

8. The method of claim 7, wherein said last-mentioned delivering step includes using a circuit switched channel to send the message from a Short Message Services Center to a mobile services switching center associated with the packet channel, and sending the message from the mobile services switching center to the mobile communication device using the layer 3 protocol.

9. A method of providing Short Message Service in a wireless telecommunications network, comprising:
    determining whether a sending apparatus from which a Short Message Service message is to be sent is operating in a packet mode;
    sending the message from the sending apparatus via a circuit switched channel unless the sending apparatus is operating in the packet mode; and
    sending the message from the sending apparatus via a packet channel if the sending apparatus is operating in the packet mode.

10. The method of claim 9, wherein the sending apparatus is a mobile communication device.

11. The method of claim 10, wherein said last-mentioned sending step includes using a TCP/IP application to send the message from the sending apparatus.

12. The method of claim 11, wherein the TCP/IP application is an E-mail browser.

13. The method of claim 11, wherein said last-mentioned sending step includes sending the message from the mobile communication device to a Short Message Services Center via the packet channel.

14. The method of claim 11, wherein the TCP/IP application is dedicated to sending Short Message Service messages over the packet channel.

15. The method of claim 10, wherein said last-mentioned sending step includes using the layer 3 protocol of the OSI protocol stack to send the message.

16. The method of claim 15, wherein said last-mentioned sending step includes using a circuit switched channel to send the message from a mobile services switching center associated with the packet channel to a Short Message Services Center, and sending the message from the mobile communication device to the mobile services switching center using the layer 3 protocol.

17. A method of providing Short Message Service in a wireless telecommunications network, comprising:
    determining that transmission of a Short Message Service message is desired; and
    sending the message via a packet channel using the layer 3 protocol of the OSI protocol stack.

18. The method of claim 17, wherein said sending step includes sending the message to a mobile communication device.

19. The method of claim 17, wherein said sending step includes sending the message from a mobile communication device.

20. The method of claim 17, wherein said sending step includes using the layer 3 protocol of the OSI stack to send the message between a mobile communication device and a mobile services switching center associated with the packet channel.

21. The method of claim 20, wherein said sending step includes using a circuit switched channel to send the message between the mobile services switching center and a Short Message Services center.

22. The method of claim 17, wherein said sending step includes using the SETUP message of the layer 3 protocol to send the message.

23. A method of transmitting a message in a wireless telecommunications network, comprising:
    determining whether a receiving apparatus to which the message is to be delivered is operating in a packet mode;
    delivering the message to the receiving apparatus via a circuit switched channel unless the receiving apparatus is operating in the packet mode; and
    delivering the message to the receiving apparatus via a packet channel if the receiving apparatus is operating in the packet mode.

24. The method of claim 23, wherein the receiving apparatus is a mobile communication device.

25. The method of claim 24, wherein said last-mentioned delivering step includes using the layer 3 protocol of the OSI protocol stack to deliver the message.

26. The method of claim 23, wherein the message is a Message Waiting Indication message from a voice mail system.

27. A method of transmitting a message in a wireless telecommunications network, comprising:

determining whether a sending apparatus from which the message is to be sent is operating in a packet mode;

sending the message from the sending apparatus via a circuit switched channel unless the sending apparatus is operating in the packet mode; and sending the message from the sending apparatus via a packet channel if the sending apparatus is operating in the packet mode.

28. The method of claim 27, wherein the sending apparatus is a mobile communication device.

29. The method of claim 28, wherein said last-mentioned sending step includes using the layer 3 protocol of the OSI protocol stack to send the message.

30. A method in a wireless telecommunications network of transmitting a message to a receiving apparatus capable of receiving the message via either one of a circuit switched channel and a packet channel which are each available to deliver the message to the receiving apparatus, comprising:

determining whether the receiving apparatus is operating in a packet mode wherein the receiving apparatus can receive the message via the packet channel;

delivering the message to the receiving apparatus via the circuit switched channel unless the receiving apparatus is operating in the packet mode; and delivering the message to the receiving apparatus via the packet channel if the receiving apparatus is operating in the packet mode.

31. The method of claim 30, wherein the message is a Short Message Service message.

32. A method in a wireless telecommunications network of transmitting a message from a sending apparatus capable of sending the message via either one of a circuit switched channel and a packet channel which are each available for sending the message from the sending apparatus, comprising:

determining whether the sending apparatus is operating in a packet mode wherein the sending apparatus can send the message via the packet channel;

sending the message from the sending apparatus via the circuit switched channel unless the sending apparatus is operating in the packet mode; and sending the message from the sending apparatus via the packet channel if the sending apparatus is operating in the packet mode.

33. The method of claim 32, wherein the message is a Short Message Service message.

* * * * *

UNITED STATES PATENT AND TRADEMARK OFFICE
CERTIFICATE OF CORRECTION

PATENT NO. : 5,978,685
DATED : November 2, 1999
INVENTOR(S) : Keijo Laiho

It is certified that error appears in the above-identified patent and that said Letters Patent is hereby corrected as shown below:

Column 4, line 47        Replace "NWI"
                                          With --MWI--

Signed and Sealed this

Twenty-ninth Day of May, 2001

Attest:

NICHOLAS P. GODICI

*Attesting Officer*      *Acting Director of the United States Patent and Trademark Office*